UNITED STATES PATENT OFFICE.

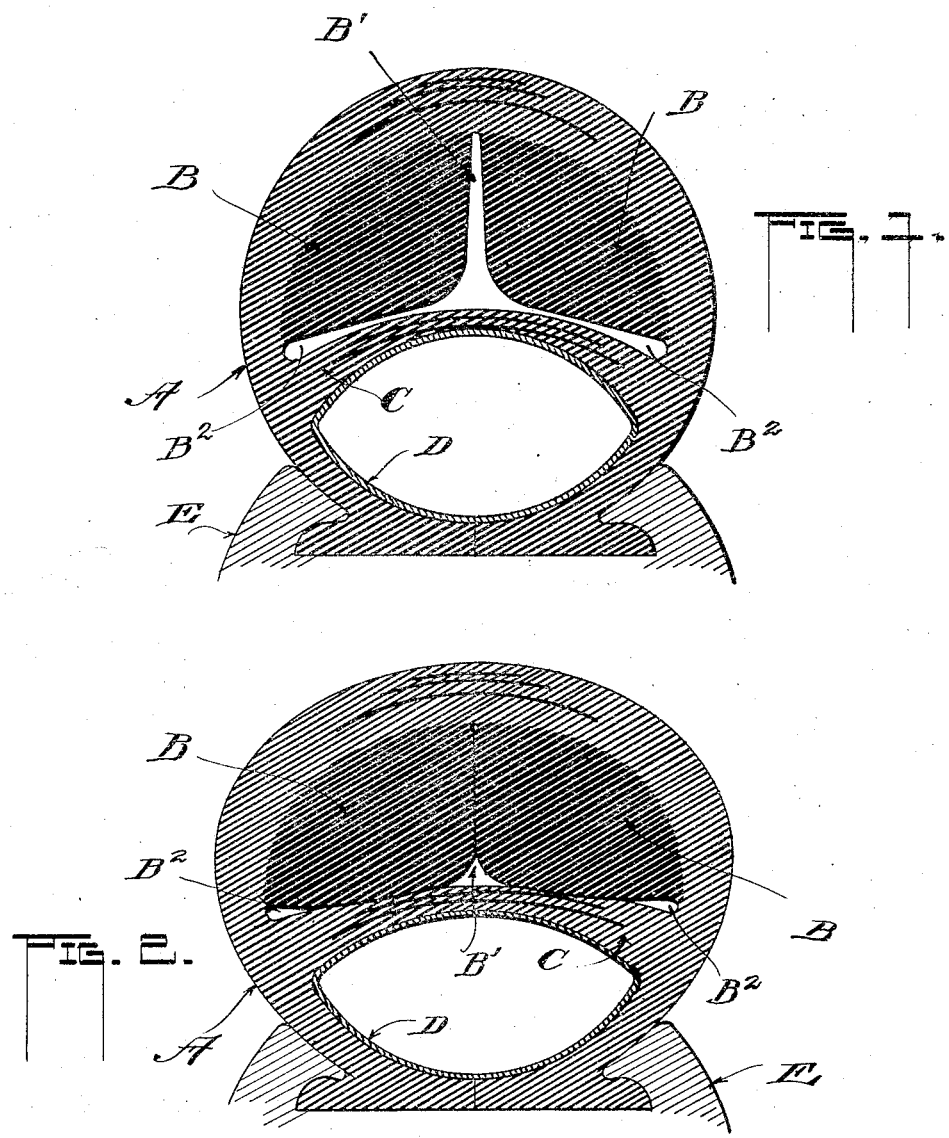

HASKELL R. ARMSTRONG, OF PEORIA, ILLINOIS.

PNEUMATIC TIRE.

1,109,101.  Specification of Letters Patent.  Patented Sept. 1, 1914.

Application filed July 2, 1912.  Serial No. 707,352.

*To all whom it may concern:*

Be it known that I, HASKELL R. ARMSTRONG, citizen of the United States, residing at Peoria, in the county of Peoria and State of Illinois, have invented certain new and useful Improvements in Pneumatic Tires; and I do hereby declare that the following is a full, clear, and exact description of the invention, which will enable others skilled in the art to which it appertains to make and use the same.

This invention relates to an improvement in pneumatic tires.

One of the objects of the invention is to locate the air-tube in a pneumatic tire at such a distance from the tread portion that it will be practically safe from injury from sharp objects on the road.

Another object is to include with the tread of a tire, as ordinarily constructed, an inner annular integral portion of relatively softer rubber than that of which said tread is made to act both as a means of obtaining resiliency together with the air tube, and to serve as a protector for the latter.

Another object is to include in a pneumatic tire a pair of annular portions preferably made integral with the tread and of relatively softer rubber than said tread and including also an annular air-space separate from that containing the air tube, said air space lying between the two soft annular portions as well as between said portions and a wall which separates that air space from the air space containing the air tube.

Other objects and advantages will appear in the following specification aided by the accompanying drawing in which:

Figure 1 is a cross section of my improved tire, and Fig. 2 is also a cross section of the tire showing substantially the relation of the parts when under pressure.

It has been the aim, heretofore, to provide a structure in a pneumatic tire that will be practically proof against puncturing without destroying the resiliency and this also is my purpose but which I do in a different manner and which I believe to be new.

The air-tube is located a very considerable distance from the tread side of the tire and interposed between said tread and the tube is a thick protecting part or parts by which sharp objects which very often penetrate even apparently thoroughly protected tires cannot reach and puncture the air tube due to the distance between the tread and the latter. This is done without increasing the diameter of the tire but by reducing the size of the air tube so that when inflated it will be smaller than the ordinary tube of the same sized tire so as to provide room for the parts about to be described. Between said tube and the tread are interposed a pair of members of relatively softer rubber than that of which the tread is composed, said members being incorporated with the rubber of the tread and formed integrally therewith. These in being of soft rubber yield under pressure and aid in imparting the desired resiliency, aided by the air tube itself upon which the weight is finally imposed through said members.

E is the wheel rim.

A represents the shoe or tire made up of the usual rubber and fabric the exact construction of which is not material. On the inner tread side of the tire are two annular portions B of soft rubber or rubber relatively softer than that of which the tread is made extending around the tire and which are preferably constructed integrally with said tread as already stated. Inward from these said parts and spaced slightly therefrom is a wall C which is an integral part of the tire. This extends across the inner space of the tire and divides it into two parts in the largest of which are the soft annular parts B B described, the other part or space receiving the air tube indicated at D. The inflation of the tube D naturally distends the wall C somewhat so that it takes substantially the form shown in Fig. 1. Between the portions or members B, and between the said portions or members and the wall C is the air space B' B² the air in which will be naturally compressed due to the inflation and the distention of the air tube D and due also to the fact that there is no outlet for air from said space and the expansion or distention of the air tube causes more or less compression of the air in said space which acts as a cushion. It is observed that the distance from the air tube to the tread is considerable as compared with tires as ordinarily constructed and in fact that distance as shown herein, which is the full size of one of the small types of tires, is about two inches so that it is necessary that an object must be at least two inches or more in length in order to pierce the entire structure and reach the air tube. Objects of that length, however, are seldom "picked up" so that under ordinary circumstances the chances of puncturing the air tube are very slight indeed. When under pressure upon the road the relation of the parts of the tire are about as shown in Fig. 2 but the real form taken, of course, depends upon the pressure carried in the air tube D and upon the weight imposed upon the tire or, in the event of striking an obstacle, the force with which the tire meets the obstacle. The air compressed in the space B′ B² by the closing together of the parts B B assists, together with the soft rubber of the parts B B, in providing resiliency together with the air tube D upon which the latter and the wall C bear. The soft rubber parts together with the air in the space in which these parts lie, and together also with the air tube D afford the required resiliency or a resiliency substantially equal to that found in a tire having the full sized air tube as usually employed. And the advantage is that the chances of puncturing the air tube are very remote on account of the considerable distance of said tube from the tread and from the fact that the soft rubber parts are not easily penetrated. A point of considerable advantage is that by the introduction of the wall C across the inner tire space a tie is created which greatly aids in preventing spreading of the walls of said tire at the rim. Thus the tire will be protected against being "rim eaten". Furthermore the air tube cannot cause blow-outs since the said wall C ties the walls of the tire together as before stated, and also because the said tube does not lie in such a position as to place great pressure upon those parts of the tire where blow-outs usually occur. An additional advantage in providing the thick portions B B is that in case of some serious damage to the air tube rendering it incapable of holding air the wheel will be supported upon said portions B B, which together with the wall C, will become seated in the base of the tire and hold the rim off of the ground and prevent it cutting the tire when the latter travels in a deflated condition.

I am aware of the fact that a variety of tires have been designed from time to time some involving cushion structures only and others combining both cushion and pneumatic features. My structure is likewise a combination of parts forming a cushion, together with an air tube but the details of construction are different from those referred to in that first the parts are few consequently producing a tire that is simple, costing but little to manufacture as compared with those of the art, and it is distinguished from them by the fact that it is entirely practical both in use and as regards its manufacture. In some of the tires referred to large cushions are furnished by spaces filled with air under atmospheric pressure. The walls surrounding the air spaces are so extensive or have such large areas that the air in time will be forced through said wall due to the weight of the vehicle supported by the tire resulting eventually in a permanently collapsed useless tire, it being well known that air under presssure will escape in the manner described.

My device does not include such a large air space that the loss of air therefrom even if such could occur, would greatly affect the weight supporting ability of the tire. Because of the small amount of air inclosed and the exceedingly small area of the three exposed points the loss of air is practically impossible. That is to say, the small volume of air contained in the spaces B′ B², which is not placed under great compression because of its small volume, will not be readily lost through the exposed limits of the spaces at the sides and tread of the tire. And even in the event that such loss did occur the short distance the parts B would travel to rest upon the partition or wall C would not affect the form of the tire. Thus the tire in practice is thoroughly dependable. The shoe is severed along its base so that the air tube may be readily inserted or removed. The inflated tube in extending across practically the full width of the tire supports the members B at their bases which in turn extend across practically the full width of the tire thus making an ideal weight-supporting medium and combining the required resiliency therewith. Contrary to other tire structures the members B, when placed under weight, upon being forced upon the air-supported partition or wall are first compressed and then made to come together to support extreme weight. The structure will support a light load without the members meeting, merely resting upon the said partition or wall, then the extreme load brings about the conditions described, and shown in Fig. 2. Thus the tire can readily adapt itself to varying loads.

Having thus described my invention, I claim:—

1. A tire comprising a shoe or casing severed along its inner side or base, a dividing partition or wall lying perpendicular to the plane of the tire and connecting the sides of the latter and dividing it into two compartments, an inner and an outer, the former adapted for receiving an air tube, and a pair of spaced members of relatively softer material than that composing the shoe or casing and lying within the outer compartment and extending longitudinally of and being integral with the inner side of the tread portion of the shoe and adapted when weight is imposed thereon to bear upon the said dividing partition and to increase in lateral measurement due to their compressibility.

2. A tire comprising a shoe or casing severed along its inner side or base, a dividing partition or wall lying perpendicular to the plane of the tire and connecting the sides of the latter and dividing it into two compartments, an inner and an outer, the former adapted for receiving an air tube, and a pair of spaced members of relatively softer material than that composing the shoe or casing and lying within the outer compartment and extending longitudinally of and being integral with the inner side of the tread portion of the shoe and adapted when weight is imposed thereon to bear upon the said dividing partition and to increase in lateral measurement due to their compressibility and adapted to abut upon one another.

In testimony whereof I affix my signature, in presence of two witnesses.

HASKELL R. ARMSTRONG.

Witnesses:
W. I. SLEMMONS,
L. M. THURLOW.